United States Patent
Kim

(10) Patent No.: US 6,451,096 B1
(45) Date of Patent: Sep. 17, 2002

(54) AIR CLEANER FOR REMOVING AIR POLLUTANTS BY WATER SPRAY TYPE OF DUST COLLECTING SYSTEM

(75) Inventor: Jong Soo Kim, Kyunggi-do (KR)

(73) Assignees: Korea Clean Air System Co., Ltd., Seoul (KR); Clean Air System Co., Ltd., Yokohama (JP); C.A.S. (Europe) B.V., Rotterdam (NL)

( * ) Notice: Subject to any disclaimer, the term of this patent is extended or adjusted under 35 U.S.C. 154(b) by 0 days.

(21) Appl. No.: 09/613,796

(22) Filed: Jul. 11, 2000

(51) Int. Cl.[7] .............................................. B01D 47/06
(52) U.S. Cl. ............................ 96/270; 96/273; 96/297; 96/300; 96/322; 96/356
(58) Field of Search ......................... 95/216, 217, 220, 95/224, 225, 199; 96/270, 272, 273, 297, 300, 322, 355, 356, 358

(56) References Cited

U.S. PATENT DOCUMENTS

| | | | |
|---|---|---|---|
| 843,180 A | * | 2/1907 | Rogers |
| 885,185 A | * | 4/1908 | Serrell |
| 1,117,309 A | * | 11/1914 | Bentz |
| 1,222,541 A | * | 4/1917 | Donham |
| 2,090,287 A | * | 8/1937 | Cornelius |
| 2,186,125 A | * | 1/1940 | Roberts |
| 2,802,543 A | * | 8/1957 | Clark |
| 3,444,670 A | * | 5/1969 | Hungate |
| 3,691,733 A | * | 9/1972 | Stockford |
| 3,726,062 A | * | 4/1973 | Hungate et al. |
| 3,785,127 A | * | 1/1974 | Mare |
| 3,795,089 A | * | 3/1974 | Reither |
| 3,861,891 A | * | 1/1975 | Noguchi et al. |
| 3,925,040 A | * | 12/1975 | Fattinger |
| 4,053,292 A | * | 10/1977 | Schneider et al. |
| 4,397,662 A | * | 8/1983 | Bloomer |
| 4,604,108 A | * | 8/1986 | Cotton, Jr. |
| 4,684,379 A | * | 8/1987 | Gambrell |
| 6,059,866 A | * | 5/2000 | Yamagata et al. |

* cited by examiner

Primary Examiner—Duane S. Smith
(74) Attorney, Agent, or Firm—Harrison & Egbert

(57) ABSTRACT

An air cleaner for removing air pollutants by a water spray type of dust collecting system, which includes a dust collecting part and an air and water separating part in the interior of an air duct, the dust collecting part composed of primary and secondary dust collectors by water spraying, each of which having a plurality of spraying nozzles layeredly arranged by predetermined intervals to be opposed at an angle of 30° from the top to bottom thereof, and a space dust collector by water spraying disposed in a space between the primary and secondary dust collectors by water spraying, such that the three-step air and water contact causes foreign materials such as dust, gases and so on to be absorbed, dissolved and settled, and the air and water separating part formed of a groove-engaged type and layeredly curved by six-step folding at an angle of 90° in consideration of air resistance, for passing only the air flowing from the dust collecting part and collecting water drops.

1 Claim, 3 Drawing Sheets

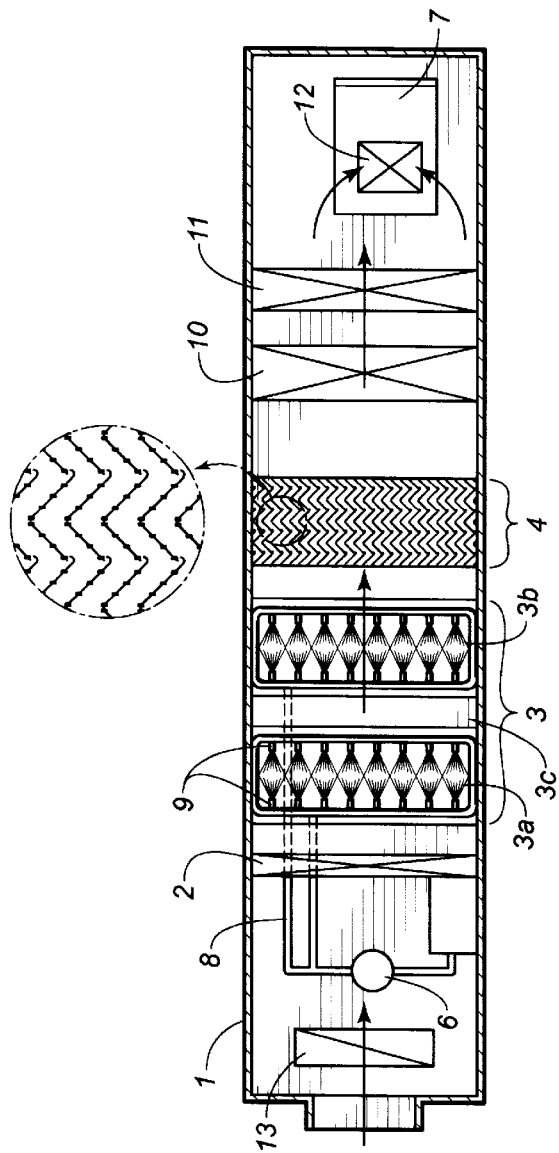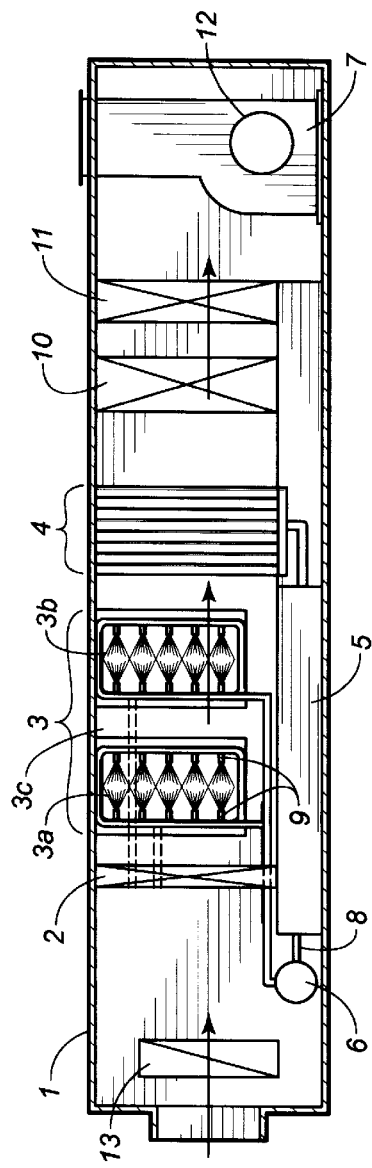

AIR CLEANER FOR REMOVING AIR POLLUTANTS BY WATER SPRAY TYPE OF DUST COLLECTING SYSTEM

BACKGROUND OF THE INVENTION

1. Field of the Invention

The present invention relates to an air cleaner for removing air pollutants by a water spray type of dust collecting system, and more particularly, to an air cleaner for removing dust, gases and all kinds of noxious materials dispersed in the external air to supply a fresh air within a room.

2. Discussion of Related Art

As well known, there are developed a large number of air cleaners, most of which use a filter. However, such type of air cleaners can remove foreign materials such as dust, but fail to completely remove air pollutants having extreme fine particles such as noxious gases, heavy metals gases and so on. Therefore, an advanced type of air cleaner employs a plasma generator for burning the air pollutants or an electron beam generator In addition, there are several kinds of air cleaners for removing noxious gases by the application of a water spray method. A most recently developed method is disclosed in Japanese Patent Laid-open No. 2000-42338 (Feb. 15, 2000), entitled "Air cleaning method and apparatus", which has the same basic construction as existing water spray systems. As shown in FIG. 4, the prior art air cleaner comprises a filter 102 installed in the one side of the interior of an air duct 101, one side spray type of spraying nozzles 103 installed in the center thereof, a plurality of collision plates 104 arranged in a zigzag manner on the opposite part to the spraying nozzles 103, for colliding against the sprayed water to thereby distribute the collided water in a fine water particle state, a water collecting tank 105 installed on the bottom surface of the lower side at which the water drops fall, for re-spraying the stored water to the spraying nozzle 103 via a pump 106 and a cooler 107, and a cooling coil 108 and a blowing fan 109 each installed on the discharge side.

As mentioned, the prior art air cleaner has a general water spray type of dust collector composed of the water spray recycle system, the blowing fan, the filter and the cooling coil, but exhibits a novel function of colliding the water sprayed from the spraying nozzles 103 against the colliding plates 104 installed in the zigzag manner to thereby disperse the colliding water. However, the colliding plates 104 cut the flowing path of air in the zigzag manner, resulting in the hindrance of the smooth air flowing due to a high resistance of air. Furthermore, due to the occurrence of a chemical variation caused by the destruction of molecules, when the air, which has been cleaned, is measured, the pollutants are detected over a reference value.

To solve this problem, therefore, the prior art air cleaner should have a high pressure of spray system for the water collision and a large capacity fan for a forced blowing, which causes a problem that the maintenance cost is expensive. Also, in case of a general air cleaning, there should be a need to install an additional chemical filter, which cause some problems that the construction thereof is substantially complicated and the maintenance thereof is not easy.

BRIEF SUMMARY OF THE INVENTION

It is, accordingly, an object of the invention to provide an air cleaner for removing air pollutants by a water spray type of dust collecting system which is capable of separating a dust collecting part and an air and water separating part in the interior of a duct through which air is passed, wherein the dust collecting part is comprised of opposing water spray type primary and secondary dust collectors by water spraying and a space dust collector by water spraying installed between the primary and secondary dust collectors by water spraying, such that the surface tension of the water by the three-step air and water contact causes the dust and gases in the air to be absorbed and dissolved, resulting in settling of the absorbed and dissolved dust and gases, thereby making the polluted air substantially clean, and the air and water separating part being formed in a groove-engaged type, passes the humid air after the air cleaning in the dust collecting part and confronts the water particles onto the groove-engaged wall surface, resulting in the separation of the air and the water particles, whereby the air cleaner can ensure that air flows smoothly with a small capacity blowing fan because of a low resistance of air. The maintenance cost is considerably reduced because a high spray pressure of water is not required, and an optimal air cleaning system which is familiar with the environment is embodied because a natural state is maintained without having any chemical or artificial change.

To accomplish this and other objects of the present invention, there is provided an air cleaner for removing air pollutants by a water spray type of dust collecting system which has a filter in the interior of a duct type of body for primarily filtering external air, a pump and a nozzle for absorbing and dissolving the flowing air with a sprayed water therefrom to thereby settle the absorbed and dissolved results and clean the polluted air, and a blowing fan for forcedly blowing the cleaned air. The air cleaner comprises: a dust collecting part and an air and water separating part in the interior of the body, the dust collecting part comprising primary and secondary dust collectors by water spraying, each of which having a plurality of spraying nozzles layeredly arranged by predetermined intervals to be opposed at an angle of 30° from the top to bottom thereof, and a space dust collector by water spraying disposed in a space between the primary and secondary dust collectors by water spraying, such that the three-step air and water contact causes foreign materials such as dust, gases and so on to be absorbed, dissolved and settled, and the air and water separating part formed of a groove-engaged type and layeredly curved by a six-step folding at an angle of 90° in consideration of air resistance, for passing only the air flowing from the dust collecting part and collecting water drops.

BRIEF DESCRIPTION OF THE SEVERAL VIEWS OF THE DRAWINGS

FIG. 1 is a plan sectional view illustrating an air conditioner according to the present invention;

FIG. 2 is a side sectional view illustrating the air conditioner according to the present invention;

DETAILED DESCRIPTION OF INVENTION

Reference will now be made in detail to the preferred embodiments of the present invention, examples of which are illustrated in the accompanying drawings.

Figure 3:
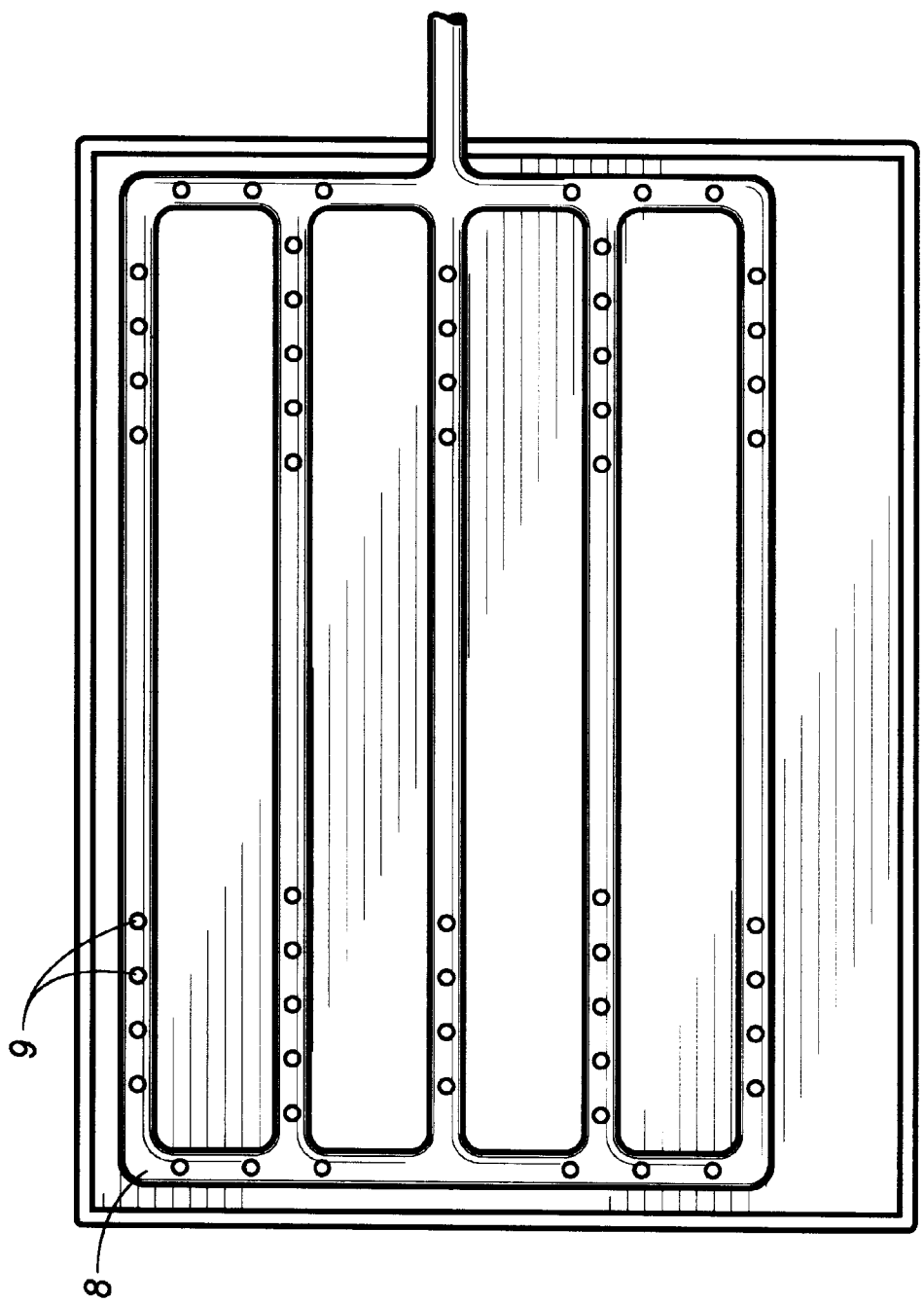
FIG. 3 is a sectional view taken along the line A—A of FIG. 2.
Figure 4:
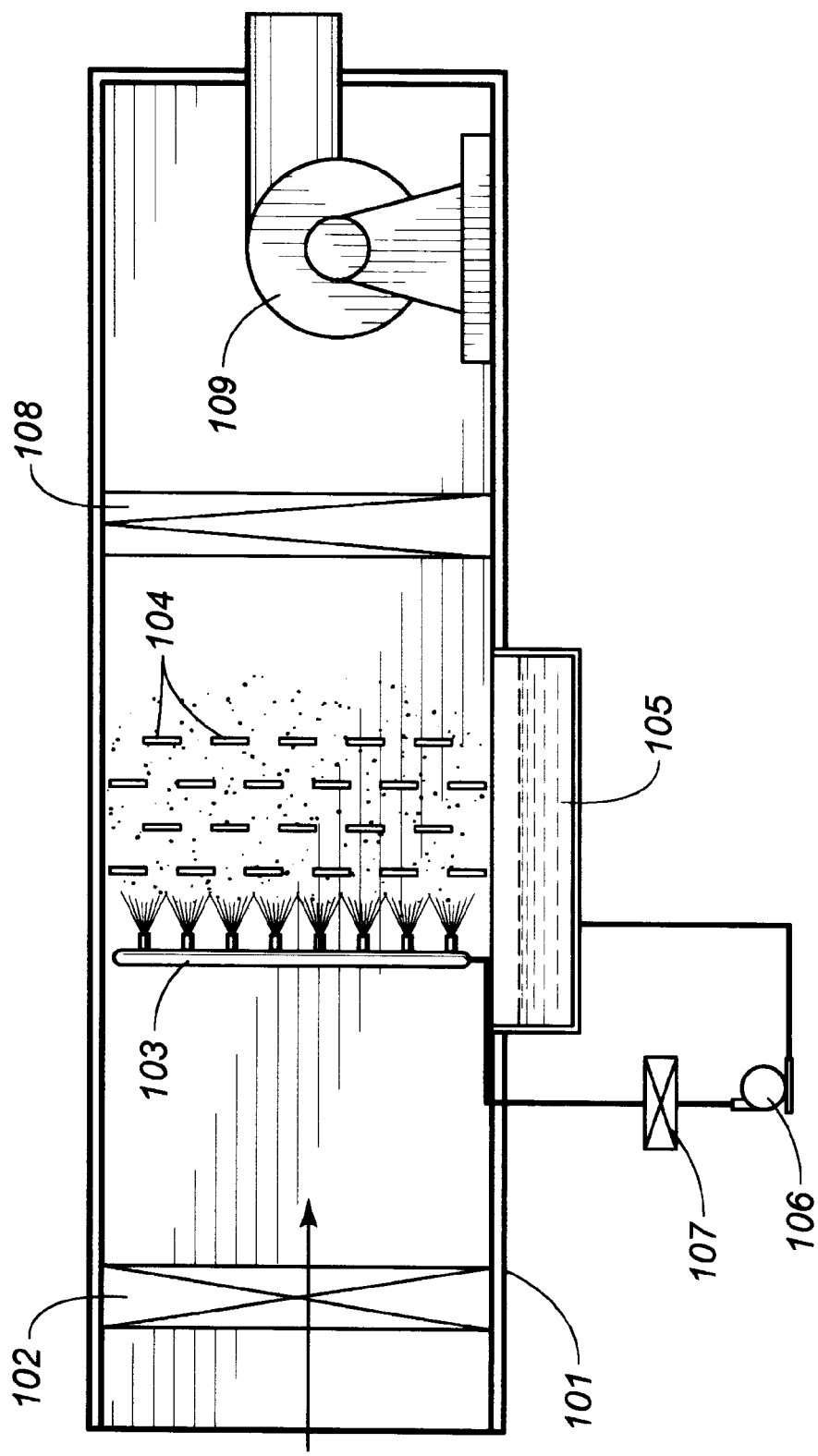
FIG. 4 is a side sectional view illustrating a prior art air cleaner.

Now, an explanation of the construction of an air cleaner according to the present invention will be in detail discussed with reference to FIGS. 1 to 3.

In construction, the air cleaner according to the present invention has a basic construction in which a water blowing preventing louver 2, a dust collecting part 3, an air and water separating part 4, a water tank 5, a pump 6 and a blower 7 in the interior of a duct type of body 1. The dust collecting part 3 is comprised of an opposed water spraying type primary and secondary dust collectors by water sprayers 3a and 3b and a space dust collector 1496-3 formed in a space between the primary and secondary dust collectors by water sprayers 3a and 3b. Each of the dust collectors by water spraying is configured in a unit of a pipe 8 and a plurality of nozzles, and the pipe 8 is positioned horizontally and in multi-step manner for the unit construction of each of the dust collectors by water spraying. At this time, the spraying direction of each nozzle is set to an angular dissipation range of 30° from the top to bottom thereof to prevent the air from being passed without any air and water contact, and each unit of the dust collectors by water spraying is detachable from the body 1.

The air and water separating part 4 is used to separate water particles and air and formed of a groove-engaged type for preventing the loss of a static pressure and providing a smooth air flowing.

The groove-engaged type is essentially formed to provide a plurality of units each which is folded through a six-step at an angle of 90° and installed by 15 mm intervals, which is then fixed to the body 1.

The pump 6 is installed as matched to a pressure of 1.2~1.5 kg/cm$^2$ in correspondence with the total quantity of flow of the nozzles 9, in the interior of the body 1 for the unit construction thereof.

The water tank 5 is essentially installed to have an additional capacity of 30% or more to the quantity of flow circulated by spraying at a time in correspondence with the total quantity of flow of the nozzles 9.

The cooling coil 10 and the heating coil 11 as basic components of the air conditioner are installed at the rear end of the air and water separating part 4 and have a capacity for adjusting the humidity and temperature.

The blower 7 is installed at the most rear end in the interior of the body 1 for noise reduction. If the blower 7 is installed at the front end of the body 1, the air speed becomes rapid, thereby making it difficult to maintain the whole system. A delivery pipe 12 serves to supply an optimally cleaned air to an indoor delivery pipe (which is not shown in the drawing), which may be connected to a circulating duct 13 for a more improved indoor cleaning.

In operation, the water supplied to the primary and secondary dust collectors by water sprayers 3a and 3b is sprayed in a pressure of 1.2–1.5 kg/cm$^2$, and the air flows thereto in a speed of 2–2.5 m/species. The primary and secondary dust collectors with water sprayers 3a and 3b have a water passing dimension of 60 communications, and a water filter film is formed within the chamber of the primary dust collector by water sprayers 3a by the pressure of the water sprayed from the primary dust collector by water sprayers 3a. At this time, the air comes in contact with the water, while passing through the water filter film. The air and water contact allows dust, all kinds of gas components and noxious materials in the air to be removed. The cleaned air in the primary dust collector with water sprayers 3a passes the water filter film formed in the space dust collector 1496-3 which is installed in the space (the section of 20 communications) between the primary and secondary dust collectors and then flows to the secondary dust collector having water sprayers 3b. Then, the air in the secondary dust collector is passed in the same manner as in the primary dust collector, to thereby obtain a maximum efficiency of the air and water contact.

The air, which has been passed through the primary and secondary dust collectors by water spray 3a and 3b, is passed through the water filter film three times. Thereby, the dust collecting part exerts a maximum removal effect for all kinds of noxious materials in the air. Then, the air flows to the air and water separating part 4. At this time, the air is passed through the groove-engaged type of the air and water separating part 4, in which the water particles are collided against the groove-engaged wall surface and thus, separated from the air. Thereby, the air, which has been passed through the air and water separating part 4, maintains the humidity of 80~85% RH containing water, which is utilized without any change in industrial applications where such the humidity is needed or is adjusted by the operation of the cooling coil 10 and the heating coil 11 in another industrial applications where the humidity should be adjusted properly.

To highly enhance a cleaning efficiency of the air flowing from the exterior, the spraying pressure of water supplied to each chamber of the primary and secondary dust collectors by water spraying is set to the pressure 1.2~1.5 kg/cm$^2$ and the flowing speed of air is set to 2~2.5 m/sec. In this case, since each chamber of the primary and secondary dust collectors by water spraying 3a and 3b is set to have the dimension of 60 cm, if the spraying pressure of water is high, an unnecessary energy is needed and an additional structure for preventing water spattering is required. Also, the setting of the air flowing speed to the speed 2~2.5 m/sec is to achieve a maximum efficiency of the air and water contact. When the air is in contact with the water, while being passed through each chamber, the contact time of the air and water is of course proportional to the air cleaning efficiency, which accompanies a problem that the space is restricted. According to the present invention, therefore, to increase the efficiency of the air and water contact, the chambers for the primary and secondary dust collectors by water spraying 3a and 3b are provided.

The formation of the space (20 cm or more) between the chambers for the primary and secondary dust collectors by water spraying 3a and 3b allows the efficiency of the air and water contact to be maximized.

In addition, the method for separating the air and the water in the air and water separating part 4 adopts the groove-engaged type for minimizing the loss of the static pressure. The rising of the static pressure in the air and water separating part 4 needs high energy, which increases only the capacity of power. Therefore, the groove-engaged type of air and water separating part 4 can effectively separate the air and water with a low static pressure.

An example of the air cleaner designed preferably according to the present invention is given as follows:

1. The air cleaner for removing air pollutants by a water spray type of dust collecting system
2. Capacity: 10,000 CMH
3. Unit
   a) Air Cleaner Body Dimensions:
      5900 m/m L×1600 m/m W×1650 m/m H
   b) External Air Inlet Dimensions:
      250 m/m L×1000 m/m W×750 m/m H
4. Dust Collectors by Water Spraying
   a) Primary Dust Collector by Water Spraying Dimensions:
      600 m/m L×1500 m/m W×1000 m/m H
   b) Secondary Dust Collector by Water Spraying Dimensions:
      600 m/m L×1500 m/m W×1000 m/m H c) Louver Dimensions:
   600 m/m L×1600 m/m W×1000 m/m H
d) The Number of Nozzles:
   Primary Dust Collector by Water Spraying: 117
   Secondary Dust Collector by Water Spraying: 117
e) Diameter of the nozzle: Ø2.3 (which is the same, in case of the primary and secondary dust collectors by water spraying)
f) Nozzle Installation Position:
   One group at intervals of 100 m/m from the top (13 nozzles)
   Four groups at intervals of 100 m/m from the top (104 nozzles)

5. Air and Water Separating Part
   a) Dimensions: 400 m/m L×1600 m/m W×1000 m/m H
   b) The Number of Units: 53
   c) Intervals of Units: 15 m/m
   d) Installation Angle:
      Groove-engaged type at an angle of 90° in a straight direction of an angle 45° to be folded at six steps 6. Water Tank
   a) Dimensions: 1300 m/m L×1600 m/m W×650 m/m H
   b) Installation Position: On the bottom end of the dust collecting part and the air and water separating part 7. Blower
   a) Airflow: 10,000 CMH (12,000 kg/hr)
   b) Static Pressure: 90 mmAq
   c) Electric Power: 3 Ø 220V 60 Hz 7.5 KW
   d) Installation of the interior of body at the discharge pipe 8. Pump
   a) Flow Rate: 300 l/min
   b) Head: 20 m
   c) Electric Power: 3 Ø 220V 3 KW
   d) Installation on the front end of the dust collecting part and connection to the water tank and nozzle pipe The measured results with the example of the air cleaner according to the present invention are below shown in Table 1, and the measurement is carried out on the rear end of the heating coil.

TABLE 1

|  | $NH_3$ | $SO_4$ | $NO_2$ | $NO_3$ | $HPO_43$ | Na | $Cl^-$ | TOC |
|---|---|---|---|---|---|---|---|---|
| External Air Concentration (ppm) | 10.08 | 85.15 | 13.60 | 18.65 | 26.85 | 0.54 | 6.95 | 356.5 |
| Measured Concentration (ppm) | 1.18 | 5.95 | 0.67 | 5.15 | 0.3 | 0.09 | 1.61 | 280 |
| Removal Efficiency (%) | 88 | 93 | 95 | 72 | 98.9 | 84.9 | 76.8 | 21.5 |

As described in the above, an air cleaner for removing air pollutants by a water spray type of dust collecting system according to the present invention is capable of passing the dust and gases in the air through the three-step chamber formed by water spray type of primary and secondary dust collectors by water spraying to absorb, dissolve and settle the polluted materials in a natural state where no chemical or artificial variation exists, thereby providing the cleaned air and passing the air containing water through an air and water separating part curvedly formed horizontally for the air resistance, through which only the air is passed and the water is collected, thereby reducing the air resistance of the whole system. In addition, the water spraying is carried out even under a low pressure and the maintenance cost is remarkably decreased and the removal efficiency of noxious materials is highly increased when compared with the existing system.

It will be apparent to those skilled in the art that various modifications and variations can be made in an air cleaner for removing air pollutants by a water spray type of dust collecting system of the present invention without departing from the spirit or scope of the invention. Thus, it is intended that the present invention cover the modifications and variations of this invention provided they come within the scope of the appended claims and their equivalents.

What is claimed is:

1. An air cleaner apparatus for removing air pollutants comprising:

a duct-shaped body having external air flowing along a direction longitudinally therethrough;

a dust collecting means disposed in an interior of said body, said dust collecting means for injecting a water spray into said interior of said body so as to absorb or dissolve the pollutants therein;

air and water separating means positioned within said body and formed to have a plurality of grooves therein, said air and water separating means for allowing only filtered air from said dust collecting means to pass therethrough while causing water droplets entrained in the filtered air to be attached to a surface of said plurality of grooves; and a blower means having a blowing fan positioned within said body, said blower means for forcedly blowing the filtered air, said dust collecting means comprising:

a primary dust collector;

a secondary dust collector, said primary dust collector and said secondary dust collector each having a plurality of spray nozzles layeredly arranged at desired intervals, said plurality of spray nozzles configured to spray water at an angular dissipation range of 30°, said plurality of spray nozzles being aligned with said direction of external air flowing through said body, said primary dust collector having a first set of spray nozzles facing a second set of spray nozzles therein without obstruction therebetween, said second dust collector having a first set of spray nozzles facing a second set of spray nozzles therein without obstruction therebetween;

a space dust collector interposed between said primary dust collector and said secondary dust collector so as to define a dust-collecting space without spray nozzles therein, said dust collecting means causing the external air to contact said dust collecting means three times while passing through said body; and a pump means positioned in said body for passing water under pressure to said dust collecting means.

* * * * *